United States Patent
Stephens et al.

(10) Patent No.: US 8,634,392 B2
(45) Date of Patent: Jan. 21, 2014

(54) NETWORK ACCESS POINTS USING MULTIPLE DEVICES

(75) Inventors: Spencer Stephens, Toluca Lake, CA (US); Leonid Kalika, Santa Monica, CA (US); Alexander Berg, Tarzana, CA (US); Cyrus Irani, Palos Verdes Estates, CA (US)

(73) Assignee: Strix Systems, Inc., Santa Clara, CA (US)

( * ) Notice: Subject to any disclaimer, the term of this patent is extended or adjusted under 35 U.S.C. 154(b) by 200 days.

(21) Appl. No.: 12/882,501

(22) Filed: Sep. 15, 2010

(65) Prior Publication Data

US 2011/0007725 A1     Jan. 13, 2011

Related U.S. Application Data

(63) Continuation of application No. 10/527,978, filed as application No. PCT/US03/28840 on Sep. 12, 2003, now Pat. No. 7,835,328.

(60) Provisional application No. 60/410,537, filed on Sep. 13, 2002.

(51) Int. Cl.
    *H04W 4/00*          (2009.01)

(52) U.S. Cl.
USPC ........... 370/338; 370/313; 370/329; 370/344; 370/389; 370/465

(58) Field of Classification Search
USPC ......... 370/313, 328, 329, 332, 338, 344, 349, 370/389, 465; 455/41.2, 432.3, 435.1, 443, 455/523
See application file for complete search history.

(56) References Cited

U.S. PATENT DOCUMENTS 6,134,587 A * 10/2000 Okanoue ...................... 709/222
6,160,804 A * 12/2000 Ahmed et al. ................ 370/349

(Continued)

FOREIGN PATENT DOCUMENTS

WO     WO-01/78246 A1     10/2001
WO     WO-2004/025887 A3     3/2004

OTHER PUBLICATIONS

Stallings, William. "IEEE 802.16 for broadband wireless", NetworkWorldFusion, Network World, Sep. 3, 2001. (This story appeared on Network World Fusion at http://www.nwfusion.com/news/tech/2001/0903tech.html. Printed from Internet on Nov. 30, 2004. (3 pages).

(Continued)

*Primary Examiner* — Andrew Lai
*Assistant Examiner* — Andrew C Lee
(74) *Attorney, Agent, or Firm* — Foley & Lardner LLP; Christopher J. McKenna; Shabbi S. Khan

(57) ABSTRACT

A system and method for providing access to a communication network includes providing a radio node comprising a first set of access point components including a radio component, and providing a physically separated controller node in communication with the radio node. The access point controller comprises a second set of access point components distinct from the first set of access point components, creating a distributed access point. A system controller may also be used to control at least one of the radio node and the controller node. The radio node, the controller node, and the system controller communicate over a communication link, such as a wireless or wired link.

20 Claims, 8 Drawing Sheets

(56) References Cited

U.S. PATENT DOCUMENTS

| | | | |
|---|---|---|---|
| 6,259,910 B1 | 7/2001 | Fairfield et al. | |
| 6,307,843 B1* | 10/2001 | Okanoue | 370/312 |
| 6,370,385 B1* | 4/2002 | Bohm et al. | 455/450 |
| 6,490,271 B1* | 12/2002 | Erjanne | 370/347 |
| 6,519,461 B1* | 2/2003 | Andersson et al. | 455/453 |
| 6,560,443 B1 | 5/2003 | Vaisanen et al. | |
| 6,690,659 B1* | 2/2004 | Ahmed et al. | 370/328 |
| 6,701,152 B1* | 3/2004 | Cohen et al. | 455/453 |
| 6,768,903 B2* | 7/2004 | Fauconnier et al. | 455/403 |
| 6,782,274 B1* | 8/2004 | Park et al. | 455/552.1 |
| 6,842,460 B1* | 1/2005 | Olkkonen et al. | 370/465 |
| 6,925,074 B1 | 8/2005 | Vikberg et al. | |
| 6,944,402 B1* | 9/2005 | Baker et al. | 398/128 |
| 6,968,190 B1* | 11/2005 | Suumaki et al. | 455/436 |
| 6,993,341 B2* | 1/2006 | Hunzinger | 455/450 |
| 7,039,140 B2 | 5/2006 | Reagan et al. | |
| 7,103,313 B2 | 9/2006 | Heinonen et al. | |
| 7,110,785 B1* | 9/2006 | Paranchych et al. | 370/333 |
| 7,165,112 B2* | 1/2007 | Battin et al. | 709/230 |
| 7,181,530 B1 | 2/2007 | Halasz et al. | |
| 7,240,214 B2 | 7/2007 | Gazzetta et al. | |
| 7,248,570 B2* | 7/2007 | Bahl et al. | 370/329 |
| 7,277,708 B2* | 10/2007 | Nakatsugawa et al. | 455/437 |
| 7,295,511 B2* | 11/2007 | Sharma et al. | 370/217 |
| 7,366,108 B2* | 4/2008 | Szentesi et al. | 370/254 |
| 7,382,756 B2 | 6/2008 | Barber et al. | |
| 7,606,594 B2* | 10/2009 | Jesse et al. | 455/554.1 |
| 8,160,020 B2* | 4/2012 | Eyuboglu et al. | 370/331 |
| 2001/0010689 A1 | 8/2001 | Awater et al. | |
| 2001/0018336 A1* | 8/2001 | Okajima et al. | 455/403 |
| 2002/0012329 A1* | 1/2002 | Atkinson et al. | 370/330 |
| 2002/0025820 A1* | 2/2002 | Fauconnier et al. | 455/452 |
| 2002/0082013 A1* | 6/2002 | Lee et al. | 455/436 |
| 2002/0082033 A1* | 6/2002 | Lohtia et al. | 455/517 |
| 2002/0085719 A1 | 7/2002 | Crobie et al. | |
| 2002/0089959 A1* | 7/2002 | Fischer et al. | 370/338 |
| 2002/0172177 A1 | 11/2002 | Gooch | |
| 2003/0016702 A1* | 1/2003 | Bender et al. | 370/522 |
| 2003/0112789 A1 | 6/2003 | Hainonen et al. | |
| 2003/0144029 A1 | 7/2003 | Wu et al. | |

OTHER PUBLICATIONS

Silicon Wave, Inc., "Silicon Wave Baseband IP" Product Summary Preliminary Information, San Diego, California, Feb. 10, 2002. (2 pages).

Atheros Communications, "Driving the wireless future: AR5001AP WLAN Access Point Solution," Sunnyvale, California, 2002. (2 pages).

Atheros Communications, "Driving the wireless future, State of the Art Security, The AR5001A Second-Generation 802.11a WLAN Solution", http://www.atheros.com/pt/ar5001A.html, Aug. 7, 2002. (7 pages).

"JC-61 Advancing Wireless Connectivity, Welcome Presentation", Doc# T102M03b: JC-61 WING Welcome Presentation, JEDEC JC-61: Jul. 15, 2002, 10 pages of slideshow presentation.

JEDEC JC-61 Committee, "Technical Background White Paper, Revision 0.9b", JC-61 Advancing Wireless Connectivity, Doc# T102M01b, Jul. 15, 2002. (11 pages).

Silicon Wave, Inc., "SiW1502 Radio Modem IC Product Summary, Preliminary Information," Sep. 28, 2000. (2 pages).

Silicon Wave, Inc, "SiW1502 Radio Modern Data Sheet", Nov. 12, 2001, San Diego, California. (13 pages).

Cambridge Silicon Radio (CSR), "BlueCore2: silicon for next-generation Bluetooth products", http://www.csr.com/products/bluecore2.htm, Aug. 7, 2002. (2 pages).

Cambridge Silicon Radio (CSR), BlueCore 2-External Single Chip Bluetooth System, Production Information Data Sheet for: BC212013 (UART only version), BC212-15 (USB and UART version), Jul. 2002. (36 pages).

http://www.csr.com/guide.htm, printed from Internet on Aug. 7, 2002. (15 pages).

* cited by examiner

NETWORK ACCESS POINTS USING MULTIPLE DEVICES

CROSS REFERENCE TO RELATED APPLICATION

This application is a continuation of U.S. patent application Ser. No. 10/527,978 filed Oct. 19, 2005 now U.S. Pat. No. 7,835,328 (Publication Number US-2006-0140161), which is a National Stage of the PCT Application PCT/US03/28840 filed Sep. 12, 2003 and published as WO2004/025887 on Mar. 24, 2004, which also claims the benefit of U.S. Provisional Patent Application No. 60/410,537, filed Sep. 13, 2002.

BACKGROUND

In a large wireless network (meaning one that serves a large number of users and/or covers a significant area) multiple access points are often desired to provide connectivity to a backbone network for various client devices. The backbone network might be a corporate network (e.g., a Local Area Network (LAN)), an extension of the Internet, or a "last mile" connection from a Wide Area Network (WAN), which might include public spaces (e.g., libraries, shopping centers, airports, etc.). A conventional access point has its core components integrated in a single device. These core components typically include an RF (radio) component, an amplifier, an antenna, a baseband module, a MAC (medium access control) module, a processor, memory, a LAN interface and so on, making the access point fairly complex and expensive. A technology specific chip or chipset typically provides lower level functions while upper level functions are sometimes provided by software running on a processor.

Access points are sometimes implemented using a single device design, sometimes called a "stand-alone unit." However, with a single device, all-in-one-style access point there is no economy of scale. Each access point costs the same to manufacture as the first, and there is no advantage to be gained from modern power processors. Also, as a system implementing access points scales, certain aspects of the system become more complex. Because software processes or other processes governing functions such as multiple access management and/or mobility (e.g., roaming or handing-off of a device from one access point to another) are sometimes distributed among multiple access points or other network-connected processing entities, the system's complexity may grow faster than the number of access points.

Open industry interface specifications between radio and baseband blocks, as well as between physical (PHY) and MAC blocks of wireless networking systems are the focus of current development in the field. For example, the JC-61 standards will initially focus on the Wireless LAN systems compliant to the IEEE 802.11 standard. Current development initiatives do not address the remote connection of the PHY and MAC blocks.

Figure 1:
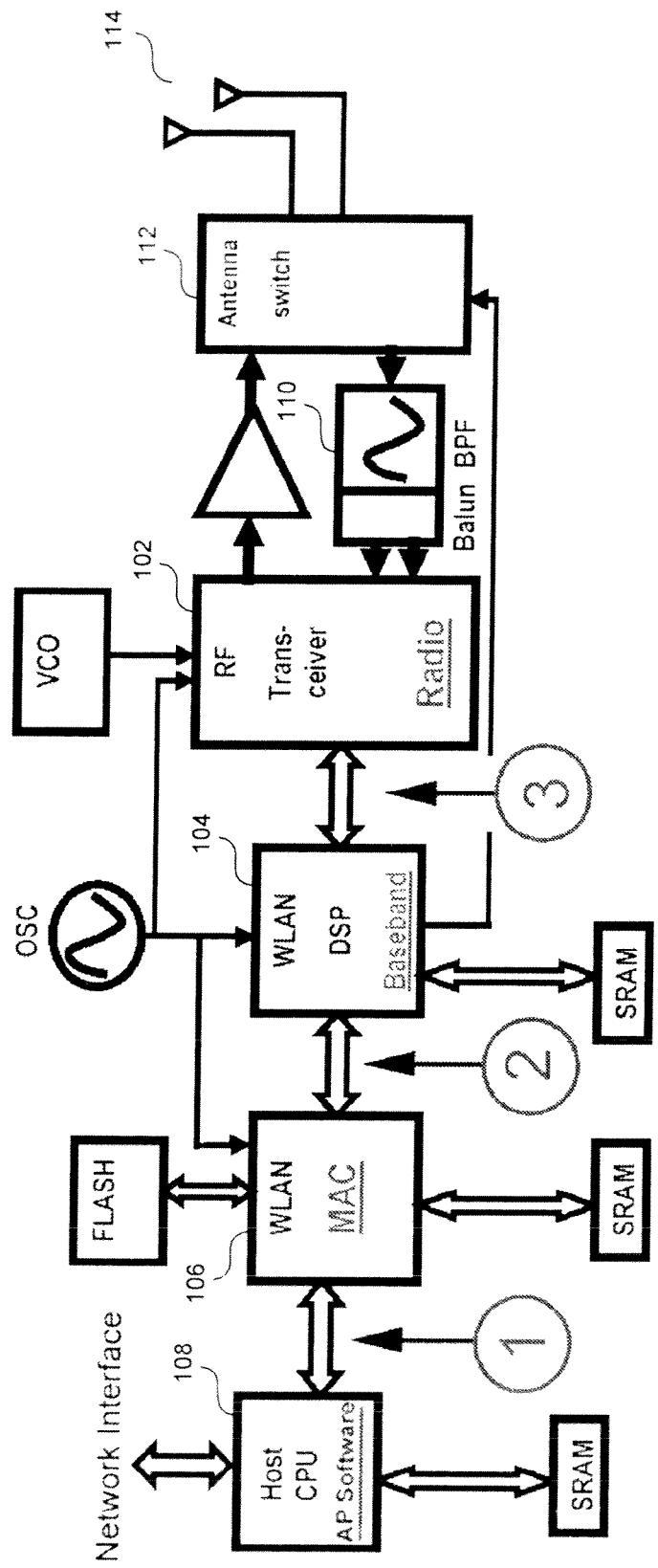
FIG. 1 is a block diagram showing components of a typical single-device access point.

In the drawings, the same reference numbers identify identical or substantially similar elements or acts. To easily identify the discussion of any particular element or act, the most significant digit or digits in a reference number refer to the Figure number in which that element is first introduced (e.g., element 604 is first introduced and discussed with respect to FIG. 6).

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The headings provided herein are for convenience only and do not necessarily affect the scope or meaning of the claimed invention.

It is intended that the terminology used in the description presented below be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

I. Overview

Described in detail below is a system that provides for the division of components of a wireless network access point between two (or more) devices that are remote from each other and that can have a one-to one, many-to-one, one-to-one or many-to-many relationship between and amongst themselves. This type of configuration is referred to as a "distributed access point" and includes multiple variations. Examples of distributed access points include the following:

A split between an RF (radio) layer and a baseband (physical) layer of any wireless access point.

A split at the HCI (host controller interaction) layer in a Bluetooth access point.

A split between the baseband layer and medium access control (MAC) layer in an IEEE 802.11 access point.

The use of distributed access points allows a minimum or reduced amount of hardware to be deployed in the locations where users desire access, while processing power (and, thus, complexity) is concentrated in an controller node that can be scaled accordingly. This configuration can be especially useful when the system is scaled to include a large number of access points.

Components involved in the distributed access point include a radio node and a controller node, used interchangeably with the terms "access dot" and "access dot controller," respectively. In some embodiments, the controller node corresponds to a collection of radio nodes in a one-to-many relationship, although a one-to-one relationship is also possible. A system controller may also be employed to control groups of distributed access points, including one or more radio nodes and their corresponding controller nodes. Like the controller, the system controller corresponds to one or more radio nodes (and their corresponding controller nodes) in a one-to-many relationship. The system controller functionality can be implemented in a distinct, centralized hardware component, such as a physical switch (e.g., wireless switch). Alternatively, the system controller can be logically centralized, but implemented using a physically distributed hosting function incorporated into one or more distributed access points (e.g., system control application running in every eighth radio node/controller node combination).

To simplify installation of such a system, the devices may be interconnected via standard (e.g., Cat-5) twisted pair wiring found in most commercial buildings to provide power as well as communication. The wired link might also use a fiber or coaxial cable. Alternatively, the devices may be interconnected using some form of wireless link. This link might be an RF link such as a point-to-point relay RF technology or it might involve a broadcast RF technology. The wireless link might be an infrared link, ultrasonic, or other wireless interface.

In a broad sense, aspects of the invention are directed to a system and method for providing access to a communication network includes providing a radio node comprising a first set of access point components including a radio component, and providing a physically separated controller node in communication with the radio node. The access point controller comprises a second set of access point components distinct from the first set of access point components, creating a distributed access point. A system controller may also be used to control at least one of the radio node and the controller node. The radio node, the controller node, and the system controller communicate over a communication link, such as a wireless or wired link.

The invention will now be described with respect to various embodiments. The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention.

II. Architecture

FIG. 1 and the following discussion provide a brief, general description of a suitable computing environment in which the invention can be implemented. Although not required, aspects of the invention are described in the general context of computer-executable instructions, such as routines executed by a general-purpose computer, e.g., a server computer, wireless device or personal computer. Those skilled in the relevant art will appreciate that the invention can be practiced with other communications, data processing or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers and the like. Indeed, the terms "computer," "host" and "host computer" are generally used interchangeably, and refer to any of the above devices and systems, as well as any data processor. Aspects of the invention can be embodied in a special purpose computer or data processor that is specifically programmed, configured or constructed to perform one or more of the computer-executable instructions explained in detail herein. Aspects of the invention can also be practiced in distributed computing environments where tasks or modules are performed by remote processing devices, which are linked through a communications network. In a distributed computing environment, program modules may be located in both local and remote memory storage devices.

Aspects of the invention may be stored or distributed on computer-readable media, including magnetically or optically readable computer discs, as microcode on semiconductor memory, nanotechnology memory, or other portable data storage medium. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched or other scheme). Those skilled in the relevant art will recognize that portions of the invention reside on a server computer, while corresponding portions reside on a client computer such as a mobile device.

The components or layers of a typical access point are shown in FIG. 1. The architecture can be divided into four main components or layers: an RF layer 102, a baseband (physical) layer 104, a medium access control (MAC) layer 106, and an access point (AP) software layer 108. These components or layers may be implemented in task-specific dedicated hardware and/or embedded software running on one or more processors, such as a CPU. Examples of dedicated hardware include the Atheros AR5001A chipset and the Cambridge Silicon Radio BlueCore. The BlueCore design uses a combination of dedicated hardware for the radio with software running on an ARM processor that provides the baseband layer 104 and a portion of the MAC layer 106 with the remainder of the MAC layer 106 and the AP software layer 108 running either on the same ARM or another CPU. Additional components may include a balun 110, an antenna switch 112, and one or more antennas 114.

In the architecture shown in FIG. 1, there are three split points at which the components or layers may be divided in accordance with various embodiments of the invention. Each division or split results in two physical devices: the radio node or "access dot" 200 and the controller node or "access dot controller" 201 (shown in more detail in FIGS. 2 through 8). At split point 1, between the AP software layer 108 and the MAC layer 106, the radio node 200 includes the AP software layer 108, and the controller node 201 includes the MAC layer 106, the baseband layer 104, and the RF layer 102. At split point 2, between the MAC layer 106, and the baseband layer 104, the radio node 200 includes the AP software layer 108 and the MAC layer 106, and the controller node 201 includes the baseband layer 104 and the RF layer 102. At split point 3, between the baseband layer 104 and the RF layer 102, the controller node 201 includes the RF layer 102 and the radio node 200 includes the AP software layer 108, the MAC layer 106 and the baseband layer 104. While not shown, other combinations of components and splits are, of course, possible.

Figure 2:
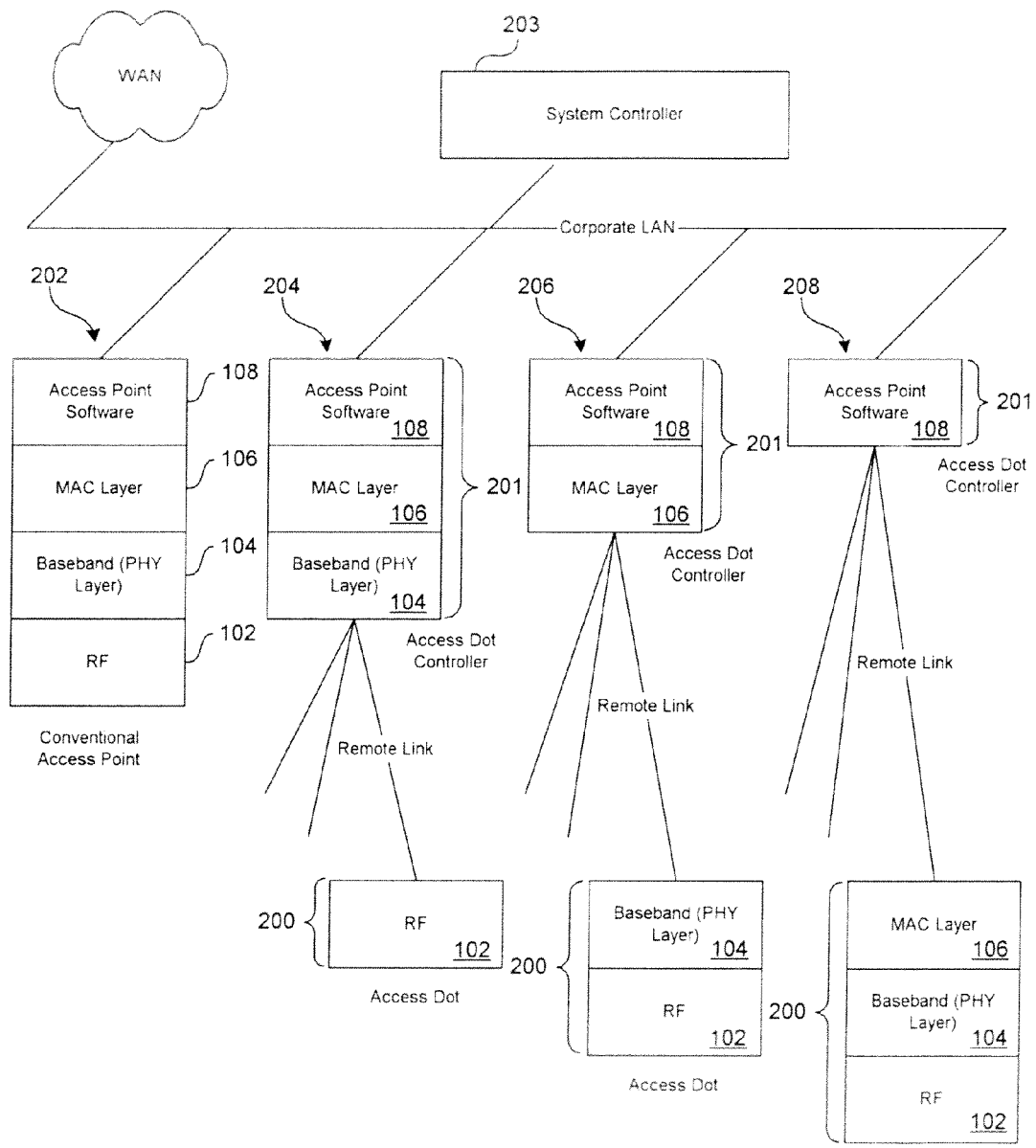
FIG. 2 is a flow diagram showing three embodiments of distributed access points resulting from various access point splits.

As further illustrated in FIG. 2, each distributed access point described above results in a distinct set of access point components or layers for the radio node 200 and the controller node 201, and a separate embodiment of the invention. A system controller 203, described in more detail with respect to FIGS. 7 and 8, may also be used to control groups of distributed access points. Configuration 202 represents a conventional single unit access point architecture, and configurations 204, 206 and 208 represent different embodiments of the invention with the physical separation being made at places equivalent to split points 1, 2, and 3 of FIG. 1, respectively. Each method of dividing the circuitry between the radio node 200 and the controller node 201 has advantages that depend on the components being used, the nature of the link, and the technology being served (e.g., wireless LAN, etc.). In general, configurations 204, 206, and 208 represent lower cost alternatives to 202. The cost of each radio node 200 decreases in correspondence to a decrease in complexity. For example, the radio node 200 of configuration 204 is less costly to produce than the radio node 200 of configuration 208. Because a system typically has multiple access points, costs savings in a large system may be significant.

While less complex radio nodes 200 are less expensive, an increase in antenna intelligence of the radio node may be needed as more access point functionality moves to the controller node 201. For example, configuration 204 has a relatively smart antenna 114 (or antenna array) when compared with configuration 208. Accordingly, configuration 204 would be well suited for a "last mile" transport signals from a wide area network, as described in more detail below.

In the illustrated embodiment, configuration 208 is designed with a dedicated connection to the controller node 201 over a cable (e.g., Category 5 Ethernet cabling). Configuration 208 may use structured packets to facilitate communication between the radio node 200 and the controller node 201, and it may bridge packets from the radio node 200 or may create Ethernet frames and IP payload packets. Configuration 208 lowers the cost to deploy large networks because the radio nodes are easily designed using commercially available chips and are less costly than the conventional access points in 202. Configuration 208 is especially useful in, for example, smaller enterprise networks where dedicated connections can be used without exceeding the Ethernet distance limitation (100 meters).

Configuration 206 is designed to further lower costs by moving additional functionality to the controller node 201 and further simplifying the radio node 200. In this case, costs are also lower because dedicated connections can be replaced with tunnels that extend over an installed data network without regard for placement of the radio nodes within specific Ethernet segments. These tunnels are used to encapsulate interface and exchange information between processing at the MAC layer 106 and processing at the baseband layer 104. Configuration 206 is especially useful in, for example, medium to large Enterprise deployments, where an in-place Ethernet network can be exploited for signal transport between the radio nodes and the controller node 201.

Configuration 204 is designed to be the lowest cost for large deployments, as the radio node 200 for configuration 204 consists of one or more antenna/radio pairs (RF). Because tunnels are employed, and because the link is essentially a radio repeater, this configuration is well-suited for non-line-of-sight deployments such as the last-mile from a WAN to a public or private site. The tunnels are used to carry a digitized form of RF data as a relay of a bit stream between the RF layer 102 and the baseband layer 104 that handles either 802.11 or Bluetooth baseband protocol. Configuration 204 is also useful in enterprise deployments that include a campus or large open space such as a manufacturing or warehouse site.

Figure 3:
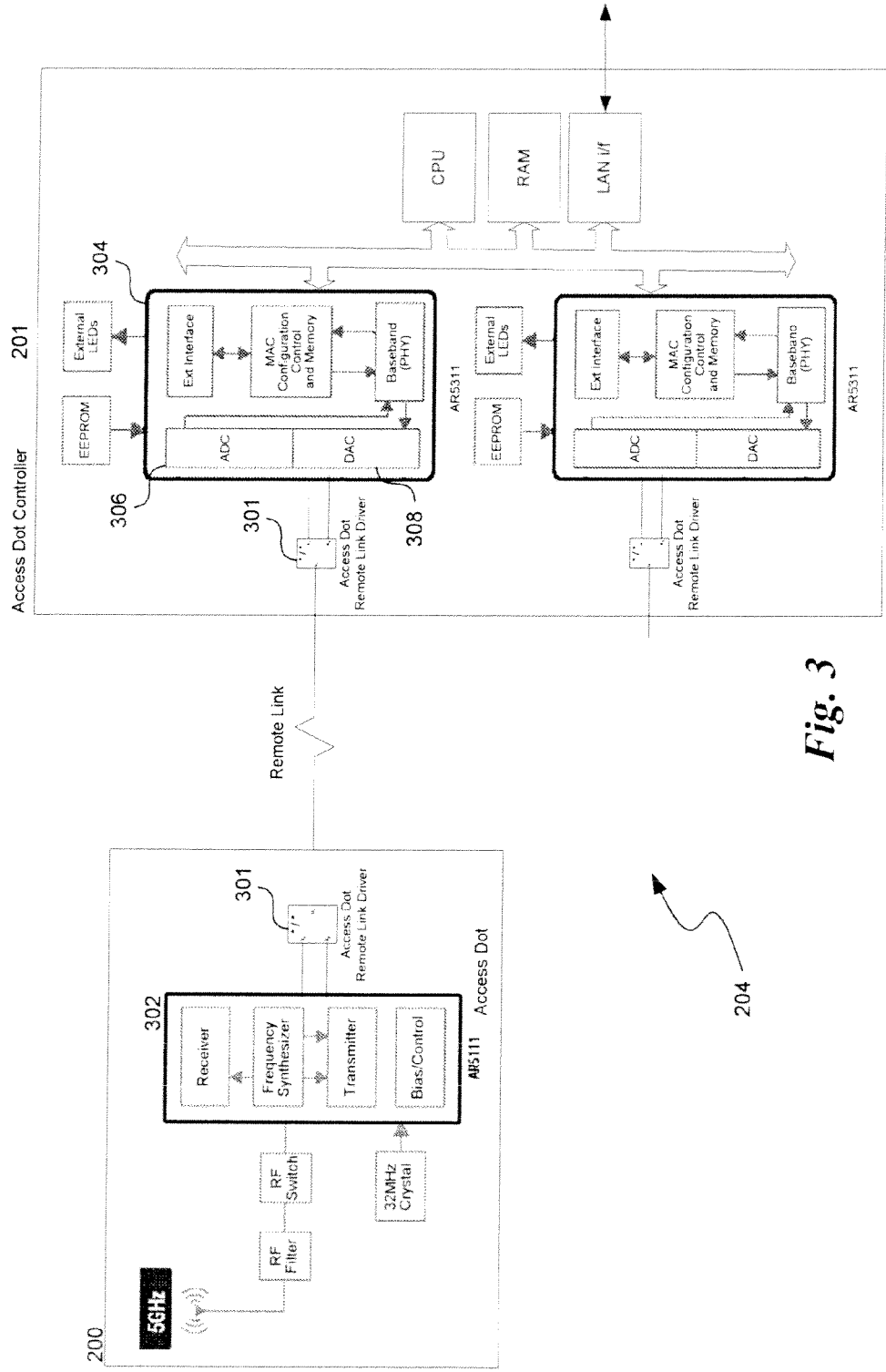
FIG. 3 is block diagram showing an example of a distributed access point implementation for one of the configurations of FIG. 2.
Figure 4:
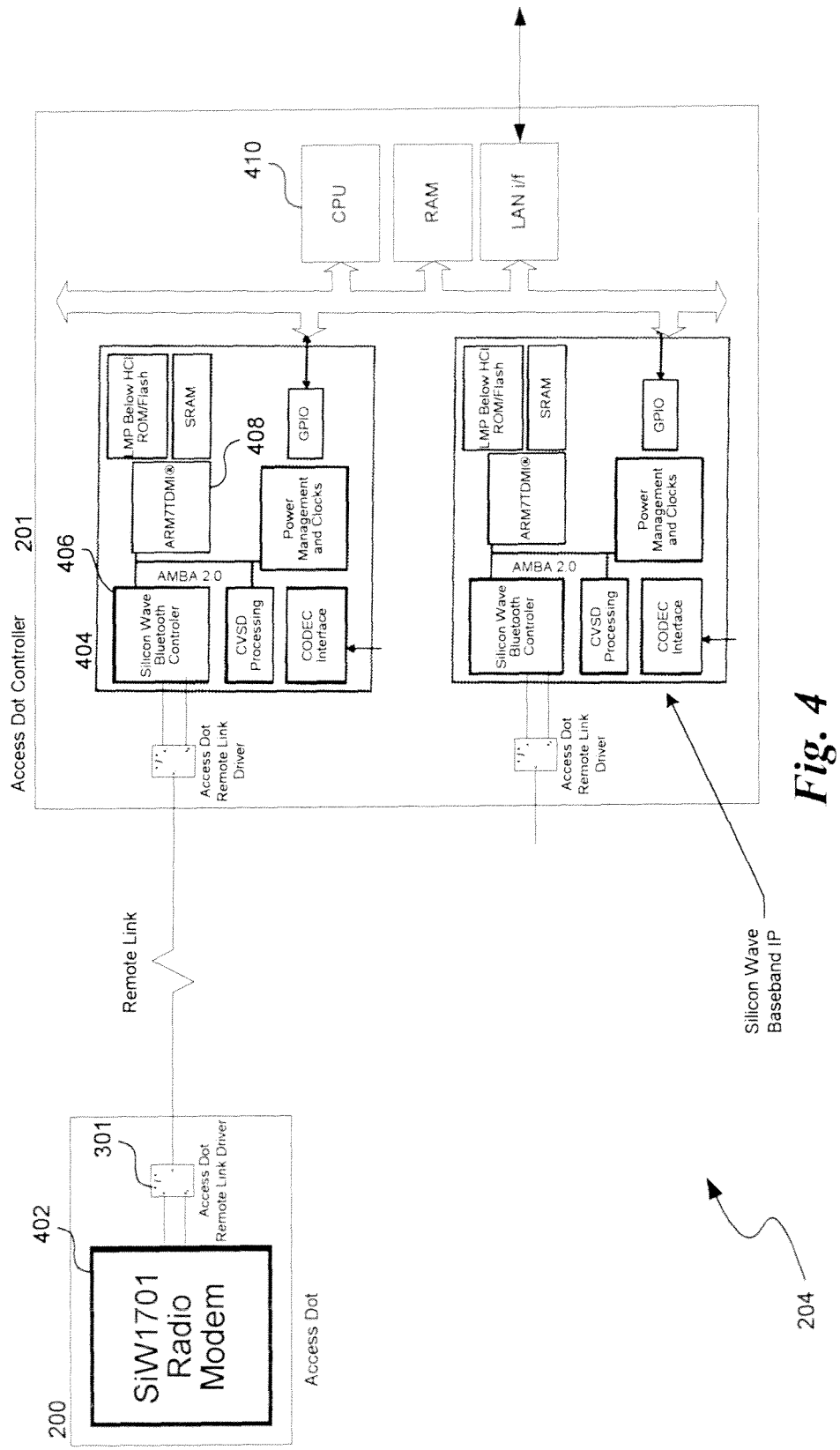
FIG. 4 is a block diagram showing an alternate example of a distributed access point implementation for one of the configurations of FIG. 2.

In some embodiments, including those where the baseband layer 104 and the RF layer 102 are divided, such as with configuration 204, the radio node 200 may use a specialized circuit, such as a remote link driver 301 (shown in FIGS. 3 through 7) to extend the bus (or wireless connection) between the baseband circuit and the RF circuit over a cable or wireless link. In the case of configuration 204, this may be done using a radio frequency bit stream in a protocol stack tunnel between baseband layer 104 and an RF layer 102. The resulting signal may be transmitted over coaxial cable or over the air as an RF signal. In this way, the controller node 201 (the module containing the baseband layer 104) and the radio node 200 (the module containing the radio) can be separated by a distance. FIGS. 3 and 4 illustrate examples of configuration 204 built using available chipsets.

With respect to configuration 206, the remote link driver 301 may carry a digitized radio frequency baseband signal encapsulated in a packet structure through a tunnel for transport over structured wiring or via RF over the air. This tunnel link could operate over a network with routers and switches and, thus, dedicated connections may not be required.

With respect to configuration to 208, the remote link driver 301 could be implemented using a structured packet technique (for example, Ethernet framing and IP packets with standard headers, or 802.11 packets encapsulated in IP) and a dedicated link to the controller node 201.

Tunnel links described with respect to configurations 204 and 206 can be either connection-oriented or connection-less communication methods that provide data encapsulation and transport mechanism between select access point layers. Where tunneling is used, an associated control plane may manage tunnel functionality and handle configuration/discovery for tunnel communications.

In some embodiments, tunnels may be implemented as Layer 2 (Ethernet) proprietary frames employing a specialized or standard protocol. Such Layer 2 frames traverse an Ethernet network through Ethernet switches, bridges and hubs. In an alternate embodiment, tunnels may be implemented as Layer 3 (IP) TCP/IP frames, where connection-oriented TCP/IP protocols are used between devices to convey information exchange.

FIG. 3 is an example implementation of configuration 204 using various commercially available chip sets, configured for 802.11. In the illustrated embodiment, an Atheros chip set is used to construct an radio node 200 containing the RF or radio stage, and an controller node 201 containing all the other elements of an 802.11 access point. In particular, the two chips in the illustrated Atheros chip set are the AR5111 chip 302, which contains the majority of the RF circuit and the AR5311 chip 304, which contains the baseband layer 104 and the MAC layer 106.

Although not illustrated for purposes of clarity, the AR5311 chip 304 includes an integrated 32-bit MIPS R4000-class processor, various serial interface devices (UARTS and LAN controllers), a local bus interface, and technology that automatically selects the data rate, error-correction mode, radio channel, power-management method and security. The AR5311 chip 304 performs receive and transmit filtering, frame encryption and decryption, and error recovery as defined in IEEE 802.11a. It also handles the host CPU interface and many other access point-related functions as defined in IEEE 802.11a.

The AR5111 chip 302 provides IF conversion, support for the IEEE 802.11a standard, integrated power amplifiers, and low-noise amplifiers. The AR5111 302 implements the orthogonal frequency division multiplexing scheme that is the radio encoding scheme for 802.11a and supports all IEEE 802.11a data rates from 6 to 54 Mbps. The AR511 chip 302 also implements forward error correction, signal detection, automatic gain control, frequency offset estimation, symbol timing, and channel estimation.

Signals between the AR5111 chip 302 and the AR5311 can both be analog and digital. The analog signals carry the data signal between the radio node 200 and the controller node 201. The digital signals are control lines. An ADC (analog-to-digital converter) 306 and a DAC (digital-to-analog converter) 308 are built in to the AR5311 chip 304. The remote link driver 301 functions to encode, transmit, and reconstruct these signals over the link medium. A typical implementation where the link is 4-pair Cat-5 twisted cable might include a balun, such as the balun 110 of FIG. 1, to send the analog signals over the first two pairs of cable (one in each direction). Parallel-to-serial and serial-to-parallel converters in conjunction with line drivers can be used to send digital control signals over the second two pairs of cable.

FIG. 4 is a suitable implementation of configuration 204 using a Silicon Wave SiW1701 radio modem 402 and a Baseband IP module 404 configured for Bluetooth. The SiW1701 RF radio modem 402 is optimized for Bluetooth wireless communications. It combines a 2.4-GHz radio transceiver and GFSK modem with digital control functions. The interface to the SiW1701 is digital and may be designed to interface with Bluetooth baseband ICs from Silicon Wave and other manufacturers.

The Silicon Wave Baseband IP module 404 provides the Bluetooth link management and control functions and is offered as a reusable IP block for microcontroller based SOC (system on a chip) designs. In combination with the SiW1701 radio modem 402, it provides a complete solution for Bluetooth applications. The Silicon Wave Baseband IP module 404 implements real-time lower layer protocol processing as called for in the baseband section of the Bluetooth Specification version 1.1. This hardware performs the logical protocol processing within the unit that enables the host to communicate over a Bluetooth link. Real-time functions such as frequency-hopping, burst timing, synthesizer programming, and clock synchronization are implemented in the hardware along with Bluetooth transmit and receive data functions.

The Silicon Wave Baseband IP module 404 also provides functions associated with the baseband layer 104 including forward error correction, cyclic redundancy checking, scrambling and unscrambling of the signal, header error correction, encryption, and decryption. These functions are split between hardware blocks such as a Silicon Wave Bluetooth Controller 406 within the Silicon Wave Baseband IP module 404 and firmware running on an embedded ARM processor 408.

As with any access point, the radio node 200 shown in FIG. 4 may be called on to perform certain higher-level functions, depending on the mode of operation. The Bluetooth LAN Access Profile requires a PPP (point-to-point protocol) link to be created on top of the Bluetooth link. The PPP link allows the access point to provide network services (i.e., LAN access) to the client device. The higher level functions run on an access point CPU 410 which may or may not be the same CPU as the ARM processor shown in the Silicon Wave Baseband IP module 404. The two processors (the ARM 408 and the block marked CPU 410) are shown separately for clarity in distinguishing the functions.

III. Alternative Embodiments

While certain embodiments have been described above, alternative embodiments may be implemented, some of which are described with respect to FIGS. 5 through 8.

Figure 5:
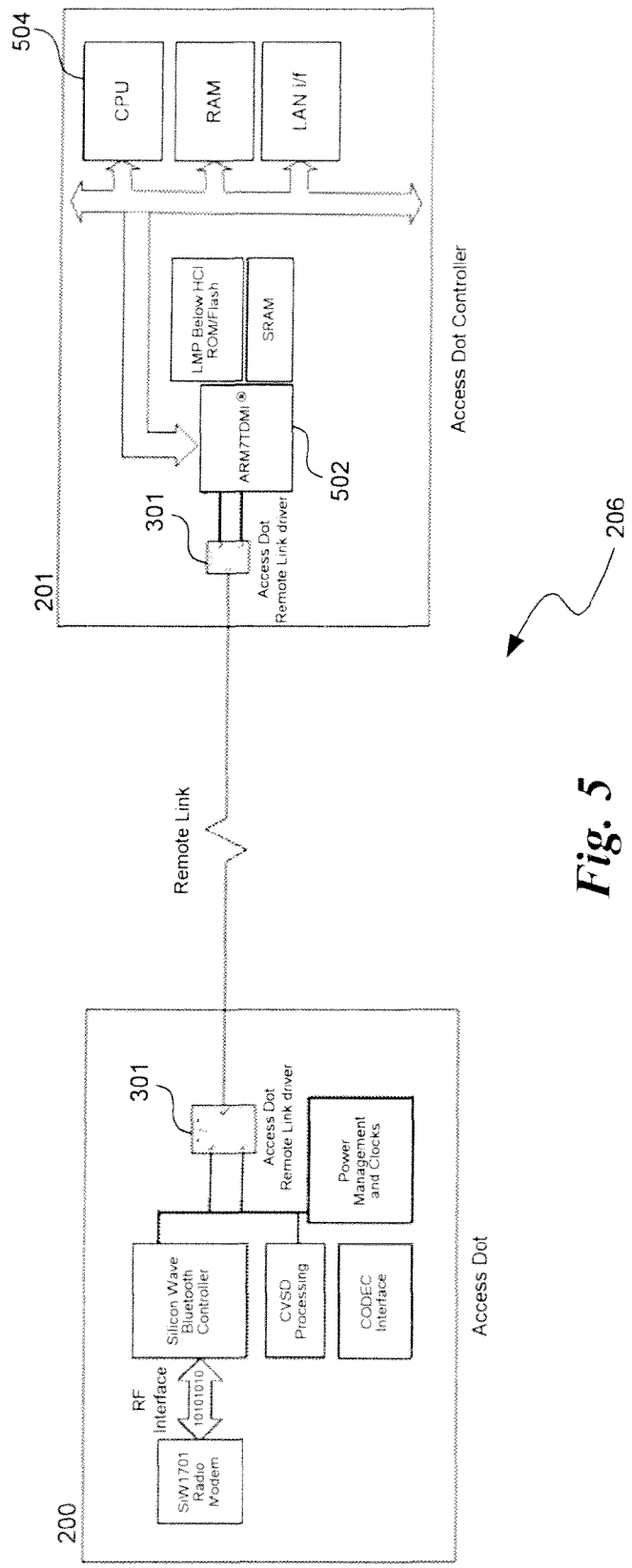
FIG. 5 is a block diagram showing an example of a distributed access point implementation for one of the configurations of FIG. 2.

FIG. 5 illustrates an embodiment of a distributed access point for Bluetooth that reflects the architecture shown in configuration 206 of FIG. 2. The baseband layer 104 and the RF layer 102 are in the radio node 200, and the MAC layer 106 and the AP software layer 108 are in the controller node 201. With this configuration, the control and data signals from the Bluetooth controller block are sent over the link to an ARM processor 502, which is resident in the controller node 201. This embodiment allows the ARM processor 502, similar to the ARM processor 408 in the Silicon Wave Baseband IP module 404 of FIG. 4, to be combined with the other CPU 504. In the illustrated embodiment, part of the components that comprise the Silicon Wave Baseband IP module 404 of FIG. 4 are located in the radio node 200. These are the hardware functions. The firmware functions of the Silicon Wave Baseband IP module 404 of FIG. 4 are located in the controller node 201. The remote link driver 301 replaces the ARM processor bus (AMBA 2.0) connection between a Bluetooth controller block (not shown) and the ARM.

Figure 6:
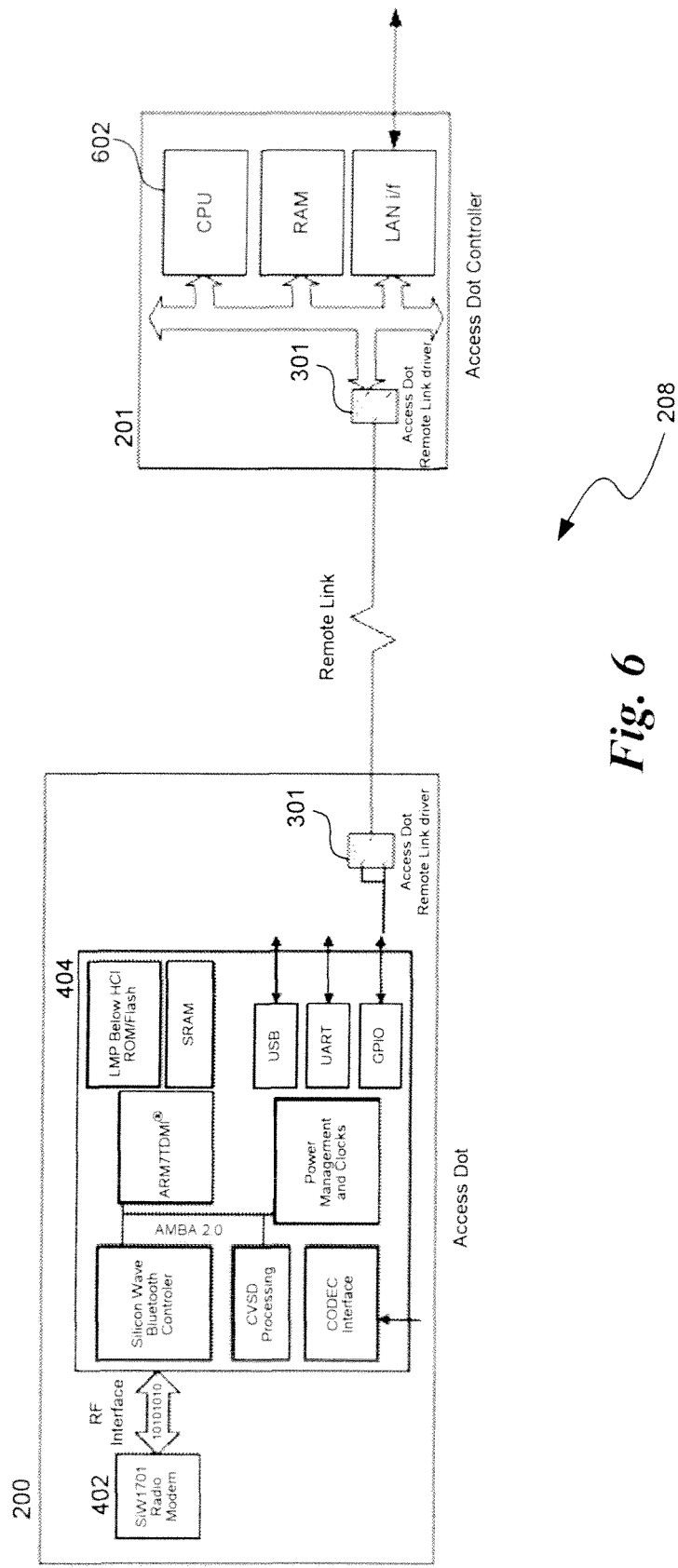
FIG. 6 is a block diagram showing an example of a distributed access point implementation for one of the configurations of FIG. 2.

FIG. 6 illustrates a Bluetooth-configured embodiment that reflects the architecture of configuration 208 of FIG. 2. The AP software is contained in the controller node 201, and all other access point functions are contained in the radio node 200. This embodiment reflects a split at the host controller interaction layer (HCI) of a typical Bluetooth access point. A complete Silicon Wave Baseband IP module 404, is located in the radio node 200, together with the SiW1710 radio 402, both shown previously with respect to FIG. 4. In this configuration, the radio node 200 would be a client of the access point controller 201 CPU 601.

Figure 7:
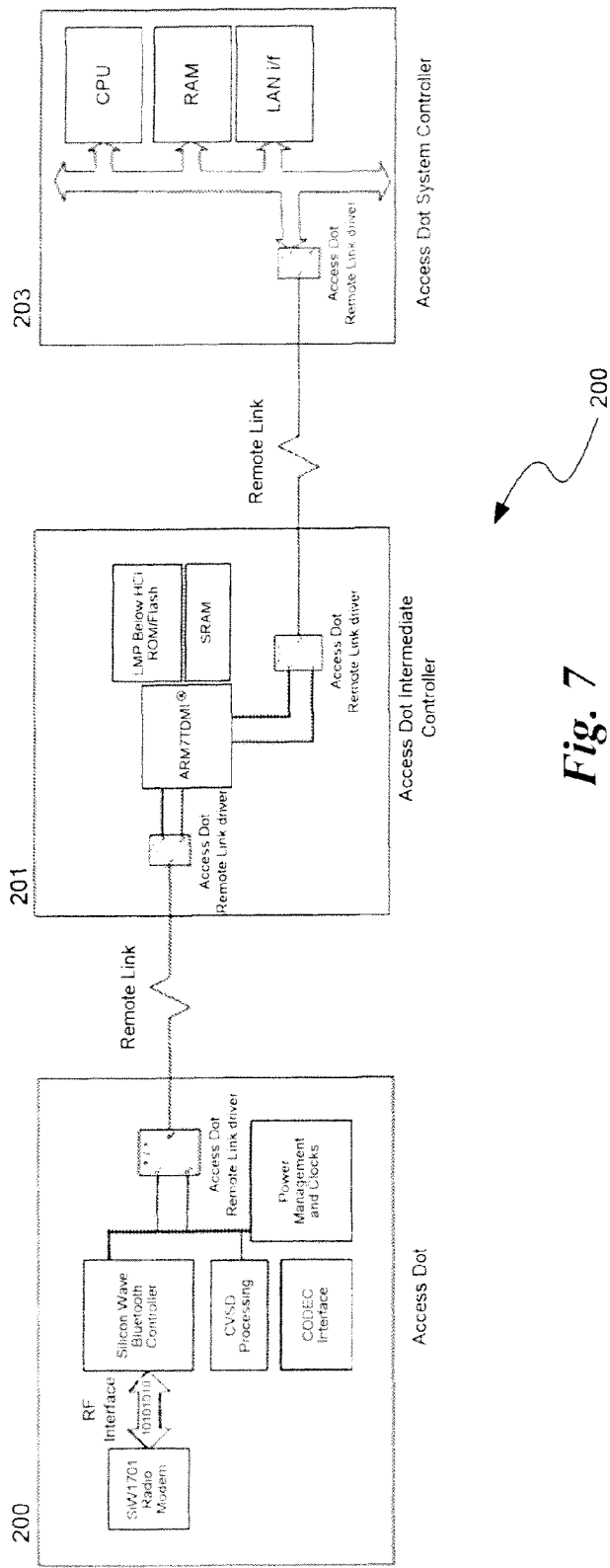
FIG. 7 is a block diagram showing an example of a distributed access point configuration in an alternate embodiment of the invention, where three types of module are used.
Figure 8:
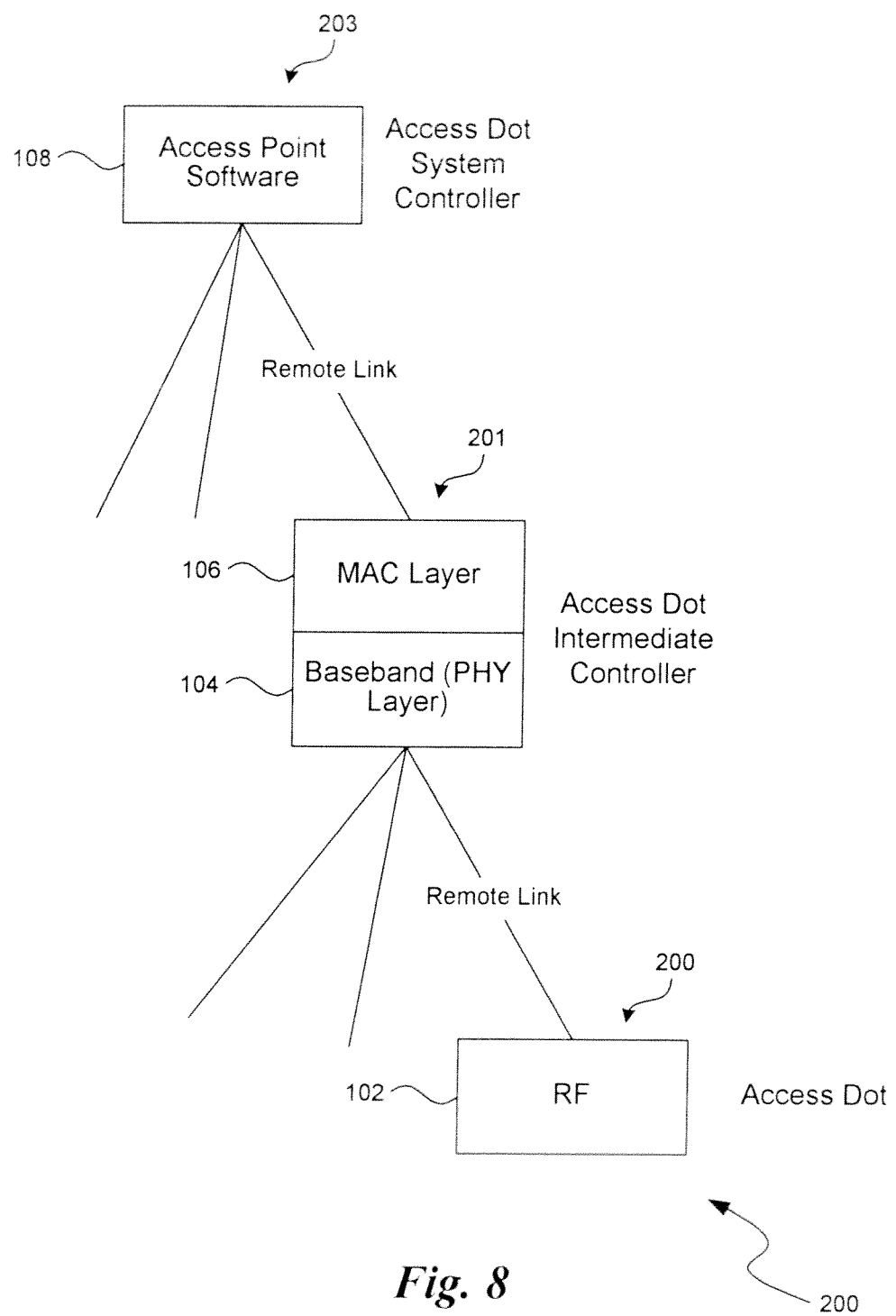
FIG. 8 is a block diagram showing the distributed access point configuration of FIG. 7 displayed using the architectural context of FIG. 2.

FIGS. 7 and 8 illustrate an embodiment of the invention as it applies to multiple components in a system. Referring to FIG. 7, the components from FIG. 4 are used to create three modules: the radio node 200, the controller node (intermediate controller) 201, and the system controller 203, previously shown with respect to FIG. 2. FIG. 8 shows this embodiment in the same architectural context as FIG. 2. In the illustrated embodiment, the system controller 203 enjoys a one-to-many relationship with multiple distributed access points, and provides further distribution of functions through a hierarchy. For example, as shown in FIG. 8, the system controller may include the AP software layer 108, the controller node may include the MAC layer 106 and the baseband layer 104, and the radio node may include the RF layer. More generally, however, there can be a one-to-one, one-to-many, many-to-one, or many-to-many relationship between and among radio nodes 200, controller nodes 201, and system controllers 203. Likewise, the functions provided by any of these components can be distributed throughout the various devices, or combined into a single component at any level.

The system controller 203 handles system-related functionality and communication with one or more distributed access points. The system controller 203 functionality can be implemented in a distinct, centralized hardware component, such as a physical switch. Alternatively, the system controller can be logically centralized, but implemented using a physically distributed hosting function incorporated into one or more radio node/controller node combinations, such as a system control application running in select radio nodes or controller nodes (depending on how they are split). In this case, there may be cross-communication between radio nodes 200 and/or controller nodes 201, via, for example, tunneling techniques, such as those described with respect to FIG. 2.

System-level functions performed by the system controller 203 can include configuration (e.g., Web/CLI/SNMP/proprietary), handling of networking protocols (e.g., SNTP, DNS, DHCP, etc), and RF management (e.g., RF channel analysis, interference avoidance, performance optimization, thorough coverage, transmit power and receive sensitivity control, etc). Other system level functions include control for distributed topology (e.g., discovery, state machine control, reporting, management and monitoring, etc). The system controller 203 may also handle statistics gathering and monitoring, security policies (e.g., authentication authorization, access control, etc.), VPN and VLAN management/distribution, and firmware and configuration distribution. Of course, the system controller may handle other functionality, or may share the above functionality with other components of the system.

In the illustrated embodiment, the controller node (intermediate controller) 201 handles communication with one or more radio node layers/components (depending on implementation) and is the appropriate control mechanism for distribution of RF-based applications. The controller node 201 may also handle baseband protocols (different for 802.11 and Bluetooth), baseband protocol configuration, monitoring, reporting MAC Layer protocols, data transfer, interworking functions, protocol conversions, security enforcement (e.g., encryption, authentication, VPN and VLAN support), etc. Like the system controller 203, the controller node may handle other functionality, or may share the above functionality with other components of the system. Although not shown in FIG. 7 or 8, multiple controller nodes 201 may be used in a similar configuration, while still allowing the distribution of certain functions while retaining a high-level of flexibility as to the type of functions that may be distributed. If not co-located with the system controller 203, the control node 201 also handles communication with the system controller.

The description of embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. For example, while blocks or functions are presented in a given order, alternative embodiments may implement blocks or perform functions in a different order, or blocks/functions may be implemented/performed substantially concurrently.

The teachings of the invention provided herein can be applied to other systems, not only the system described herein. For example, the teachings of the invention can be applied to the systems described in commonly assigned U.S. patent application Ser. No. 10/052,910, filed Jan. 18, 2002, entitled "Link Context Mobility, such as for use in Wireless Networks," PCT Application No. US02/13880, filed May 2, 2002, entitled "Wireless Base Station Neighbor Discovery," U.S. patent application Ser. No. 10/139,609, filed May 2, 2002, entitled "Wireless System Base Station to Base Station Synchronization," U.S. patent application Ser. No. 10/139,130, filed May 2, 2002, entitled "Wireless System Base Station to Base Station Synchronization," PCT Application No. US02/13710, filed May 2, 2002, entitled "Method for Load Balancing Wireless Networks," PCT Application No. US02/13879, filed May 2, 2002, entitled "Frequency Hopping Spread Spectrum Wireless Systems Interference Mitigation by Transmit Suppression," PCT Application No. US02/13889, filed May 2, 2002, entitled "Visual Base Station Wireless Link Quality Indicator," and U.S. patent application Ser. No. 10/218,178, filed Aug. 12, 2002, entitled "Virtual Linking Using a Wireless Device," each currently pending and each herein incorporated in its entirety by reference. Aspects of the invention can be modified, if necessary, to employ the systems, functions and concepts of the various references described above to provide yet further embodiments of the invention. The various embodiments can also be combined to provide further embodiments.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps or components are presented in a given order, alternative embodiments may perform routines having steps or components in a different order. The teachings of the invention provided herein can be applied to other systems, not necessarily the network communication system described herein. The elements and acts of the various embodiments described above can be combined to provide further embodiments and some steps or components may be deleted, moved, added, subdivided, combined, and/or modified. Each of these steps may be implemented in a variety of different ways. Also, while these steps are shown as being performed in series, these steps may instead be performed in parallel, or may be performed at different times.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words in the above detailed description using the singular or plural number may also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The teachings of the invention provided herein can be applied to other systems, not necessarily the system described herein. These and other changes can be made to the invention in light of the detailed description. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above detailed description. While the above description details certain embodiments of the invention and describes the best mode contemplated, no matter how detailed the above appears in text, the invention can be practiced in many ways. Details of the protocol, data model, and processing scheme may vary considerably in its implementation details, while still being encompassed by the invention disclosed herein. As noted above, particular terminology used when describing certain features, or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A distributed access point, comprising:
  a radio node of a plurality of radio nodes configured to communicate with a client, the radio node comprising a set of radio frequency layer components and a first remote communication component; and
  a controller node configured to be remotely located relative to the radio node, the controller node comprising a set of access point software layer components and a second remote communication component that is configured to establish a first remote communication link with the first remote communication component of the radio node for communication with the radio node, wherein the controller node is configured to communicate with the plurality of radio nodes via remote communication links established between the second remote communication component and respective first communication components of the plurality of radio nodes and communicate with the client only via at least one radio node of the plurality of radio nodes; and
  wherein the radio node and the controller node together are configured to provide an intended functionality of the distributed access point, wherein the first remote communication component and the second remote communication component configured to establish a tunnel configured to carry a digitized form of RF data as a relay of a bit stream between an RF layer and a baseband layer that is configured to handle either 802.11 or Bluetooth baseband protocol.

2. The distributed access point of claim 1, wherein one of the radio node or the controller node further comprises a set of physical layer components.

3. The distributed access point of claim 1, wherein one of the radio node or the controller node further comprises a set of medium access control (MAC) layer components.

4. The distributed access point of claim 1, wherein the controller node includes a set of physical layer components and a set of medium access control (MAC) layer components.

5. The distributed access point of claim 1, wherein the remote communication link is a wireless communication link, a short-range wireless communication link, a BLUETOOTH link, or a wired link.

6. The distributed access point of claim 1, wherein each of the radio node and the controller node comprises a remote link driver configured to provide the remote communication link by extending a bus or using a protocol stack tunnel between corresponding components of the radio node and the controller node.

7. The distributed access point of claim 1, wherein each of the plurality of radio nodes includes a corresponding set of radio frequency layer components and a corresponding first remote communication component, each of the plurality of radio nodes configured to provide a respective client of a plurality of clients, access to the communication network via the same controller node.

8. The distributed access point of claim 7, wherein the radio node is further configured to establish a corresponding remote communication link with the controller node such that the controller node is configured to communicate with each of the plurality of radio nodes to provide the clients corresponding to respective radio nodes of the plurality of radio nodes, access to the communication network.

9. The distributed access point of claim 7, wherein each of the plurality of radio nodes and the controller node corresponds to one of a plurality of distributed access points.

10. The distributed access point of claim 9, wherein the controller node is operatively connected to a system controller that is configured to control at least one of the plurality of distributed access points.

11. The distributed access point of claim 10, wherein the system controller is implemented as a physical switch.

12. The distributed access point of claim 10, wherein the system controller is logically centralized and implemented using a physically distributed hosting function incorporated into at least one of the plurality of distributed access points.

13. A system, comprising:
  a plurality of distributed access points comprising
    i) a first quantity of radio nodes, each radio node comprising a set of radio frequency layer component and a first remote communication component, the radio nodes configured to establish a communication link with at least one client; and
    ii) a second quantity of controller nodes configured to be remotely located relative to the radio nodes, each controller node comprising a set of access point software layer components and a second remote communication component that is configured to establish a remote communication link with at least two first remote communication components corresponding to two radio nodes of the first quantity of radio nodes for communications with the two radio nodes, wherein each controller node is configured to communicate with the at least one client only via at least one radio node of the first quantity of radio nodes, wherein the plurality of distributed access points include a greater number of radio nodes than controller nodes, wherein a first remote communication component of a first radio node of the first quantity of radio nodes and a second remote communication component of a first controller node of the second quantity of controller nodes configured to establish a first tunnel configured to carry a digitized form of RF data as a relay of a bit stream between an RF layer and a baseband layer that is configured to handle either 802.11 or Bluetooth baseband protocol and wherein a first remote communication component of a second radio node of the first quantity of radio nodes and the second remote communication component of the first controller node configured to establish a second tunnel configured to carry a digitized form of RF data as a relay of a bit stream between an RF layer and a baseband layer that is configured to handle either 802.11 or Bluetooth baseband protocol; and
  wherein the first radio node and the first controller node together are configured to provide an intended functionality of a first distributed access point of the plurality of distributed access points and wherein the second radio node and the first controller node together are configured to provide an intended functionality of a second distributed access point of the plurality of distributed access points.

14. A distributed access point for providing a client access to a communication network, comprising:
 a radio node configured to communicate with a client, the radio node comprising a set of radio frequency layer components and a first remote communication component; and
 a controller node remotely located relative to the radio node, the controller node comprising a set of access point software layer components and a second remote communication component that is configured to establish a remote communication link with the first remote communication component of the radio node to communicate with the radio node, wherein the controller node is configured to communicate with the client only via the radio node and wherein the radio node and the controller node together are configured to provide an intended functionality of the distributed access point, wherein the first remote communication component and the second remote communication component configured to establish a tunnel configured to carry a digitized form of RF data as a relay of a bit stream between an RF layer and a baseband layer that is configured to handle either 802.11 or Bluetooth baseband protocol.

15. The distributed access point of claim 14, wherein one of the radio node and the controller node further comprises a set of physical layer components and a set of medium access control (MAC) layer components.

16. The system of claim 14, wherein the controller node does not include the set of radio frequency layer components.

17. The system of claim 14, wherein the radio node does not include the set of physical layer components or a set of medium access control (MAC) layer components.

18. The distributed access point of claim 14, wherein the controller node is configured to establish a plurality of communication links with remote communication components of a plurality of radio nodes remotely located relative to the controller node.

19. The distributed access point of claim 14, wherein the controller node includes the set of physical layer components and the set of medium access control (MAC) layer components.

20. The system of claim 14, wherein the remote communication link is a wireless communication link, a short-range wireless communication link, a BLUE-TOOTH link, or a wired link.

* * * * *